US012621051B2

(12) United States Patent
Zhang et al.

(10) Patent No.: US 12,621,051 B2
(45) Date of Patent: May 5, 2026

(54) LEO SATELLITE CONGESTION CONTROL ROUTING METHOD

(71) Applicant: Beijing University of Posts and Telecommunications, Beijing (CN)

(72) Inventors: Jiaxin Zhang, Beijing (CN); Kaiwei Wang, Beijing (CN); Xing Zhang, Beijing (CN); Rui Li, Beijing (CN); Zhaoyang Chang, Beijing (CN); Yilong Zhang, Beijing (CN); Hang Lu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 314 days.

(21) Appl. No.: 18/599,958

(22) Filed: Mar. 8, 2024

(65) Prior Publication Data

US 2024/0305364 A1 Sep. 12, 2024

(30) Foreign Application Priority Data

Mar. 9, 2023 (CN) .......................... 202310223892.0

(51) Int. Cl.
*H04B 7/185* (2006.01)
*H04B 7/19* (2006.01)
(Continued)

(52) U.S. Cl.
CPC ........... *H04B 7/18584* (2013.01); *H04B 7/19* (2013.01); *H04B 7/195* (2013.01); *H04L 45/32* (2013.01)

(58) Field of Classification Search
CPC ...... H04B 7/19; H04B 7/195; H04B 7/18584; H04L 45/32
See application file for complete search history.

(56) References Cited

U.S. PATENT DOCUMENTS 6,178,163 B1 * 1/2001 Yuan ...................... H04B 7/195
370/393
2015/0282003 A1 * 10/2015 Noerpel ................ H04L 47/263
370/236

(Continued)

FOREIGN PATENT DOCUMENTS

WO WO-2024024051 A1 * 2/2024 ........... H04W 40/12

*Primary Examiner* — Ricky Q Ngo
(74) *Attorney, Agent, or Firm* — MARSHALL, GERSTEIN & BORUN LLP

(57) ABSTRACT

A Low Earth orbit (LEO) satellite congestion control routing method is disclosed, including: Step 1: A LEO satellite periodically detecting queue lengths of a plurality of ports and informing a Geostationary Earth Orbit (GEO) satellite of queue lengths of congested ports in the plurality of ports; Step 2: The GEO satellite sending the queue lengths of congested ports to a ground station, and a computing center of the ground station calculating link status weights according to the queue lengths of congested ports; Step 3: According to the link status weights, the computing center of the ground station determining a congestion area; Step 4: The computing center of the ground station calculating a routing table of satellites in the congestion area, and the ground station sending the routing table to a LEO satellite inside the congestion area; Step 5: The LEO satellite in the congestion area receiving the routing table, and performing end-to-end transmission of data packets to a destination LEO satellite according to the routing table.

6 Claims, 5 Drawing Sheets

(51) Int. Cl.
  H04B 7/195       (2006.01)
  H04L 45/00       (2022.01)

(56)            References Cited

U.S. PATENT DOCUMENTS

| | | | | |
|---|---|---|---|---|
| 2020/0328803 | A1* | 10/2020 | Cooke | H04W 36/26 |
| 2023/0032024 | A1* | 2/2023 | Roy | H04W 24/08 |
| 2023/0059780 | A1* | 2/2023 | Ravishankar | H04B 7/195 |
| 2024/0250899 | A1* | 7/2024 | Ravishankar | H04B 7/195 |
| 2025/0168740 | A1* | 5/2025 | Matsui | H04W 40/12 |

* cited by examiner

LEO SATELLITE CONGESTION CONTROL ROUTING METHOD

CROSS REFERENCE

This application claims priority to Chinese Patent Application No. 202310223892.0, entitled "an Area-Segmentation Enabled Congestion Control Routing Method in a LEO Satellite Network" filed on Mar. 9, 2023, which is incorporated by reference in its entirety.

TECHNICAL FIELD

The present application relates to the field of the satellite communication systems, and in particular to a congestion control routing method in mega-constellation.

BACKGROUND

In mega-constellation networks, considering issues such as large signaling overhead and limited on-board resources, it is very difficult to design a reliable routing method that takes into account user service quality. Especially in scenarios where the business volume is large and unevenly distributed, routing transmission may also face the problems of load imbalance and network congestion.

The traditional method to solve this problem is the global update routing method. The method simplifies the routing mechanism, floods fault information to all nodes with routing calculation functions, implements centralized management and control of the satellite network, calculates routing tables, and completes rerouting. The inventor X. Haitao et al. disclosed in the invention patent application number CN202210681267.6 and the invention title "A Method and System for Optimal Routing of Multiple LEO Satellites" that the method includes: S1. The terminal equipment establishes a data connection with the ground base station, and the terminal equipment sends a first communication request to the ground base station; S2. After receiving the first communication request, the ground base station performs ephemeris calculation; The ground base station sends a second communication request to a LEO satellite that is within the beam coverage area and can provide business services; S3. After receiving the second communication request, the LEO satellite performs inter-satellite measurement through the ranging communication integrated module, perform topology update and route calculation based on the ranging results, and obtain the updated constellation topology information and route calculation results; S4. The LEO satellite sends the updated constellation topology information and route calculation results back to the ground base station; S5. The ground base station evaluates the congestion probability of the LEO satellite based on the real-time tracking of traffic in the LEO satellite; S6. The ground base station evaluates the congestion probability of the LEO satellite based on the calculated congestion probability of the LEO satellite. The constellation topology information and routing calculation results sent back by the satellite select a LEO satellite communication path with a small congestion probability and a short path length; S7. The terminal device communicates with the LEO satellite selected by the ground base station for communication.

It is proposed to use ground base stations to complete the assessment of congested links and the calculation of communication paths. In an article titled "Research on Dynamic Topology Analysis and Routing Mechanism of LEO Satellite Networks", W. Yinggang proposed using the ground control center to macro-control heavily congested satellites and reroute to calculate a new multi-path routing table. In an article titled "An Adaptive Routing Algorithm for Integrated Information Networks", F. Wang et al. proposed a software-defined network architecture based on a three-layer satellite network, in which high-orbit satellites and medium-orbit satellites serve as control nodes, and LEO satellites serve as control nodes. The satellite is responsible for receiving commands and forwarding data packets.

In order to deal with the above problems, the method of partially updating routing is proposed, that is, collecting part of the satellite status information to complete routing. The method relies on the satellite's own capabilities to complete routing forwarding, reducing the signaling overhead in the communication process. Inventor J. Xiaoyong and others disclosed the invention in patent application number CN202110478573.3, titled "A distributed routing management method for ultra-large-scale LEO satellite constellations". Step S1. Build a satellite scenario; calculate the satellite network based on the Walker constellation configuration. Topological structure, use a quantitative method to divide the length interval of the inter-satellite link, and establish a lateral forwarding priority comparison table according to the variation pattern of the lateral length, Step S2. use a two-dimensional grid transmission path to find out from the minimum hop count path set The path with the shortest transmission distance; determine the forwarding direction of the data packet based on the destination address and source node address; when the data packet runs to any satellite node, the forwarding direction is determined based on the lateral forwarding priority comparison table maintained by each node and the link congestion situation One-hop forwarding path, Step S3. Adjacent satellite nodes periodically exchange their own status information. When a node satellite failure is detected, the fault information is flooded. The satellite node completes the construction of the fault area based on the received information and processes and forwards it to the local node. Node data packets. In an article titled "A Distributed Survivable Routing Algorithm for Mega-constellations with Inclined Orbits", X. Qi et al. proposed a distributed routing method with a fault recovery mechanism, where satellites flood faults within a restricted number of hops. Link status information. In an article titled "Multi-commodity Flow Routing for Large-scale Leo Satellite Networks Using Deep Reinforcement Learning", K. C. Tsai et al. proposed a satellite routing method based on reinforcement learning. The satellite uses the delay of the next hop as a reward to Transmit packets.

When the business volume is large, LEO satellite networks are prone to network congestion problems. In this case, the global update route method has weak generalization. The method needs to collect the entire network link status information and rely on the entire network view to complete routing. The decision, resulting in huge latency and packet loss, is not suitable for mega-constellations. In addition, due to limited satellite computing and storage resources, the method of locally updating routing puts great pressure on the satellite network, and the loads in different areas of the mega-constellation network vary greatly. The method focuses on local status information and is prone to detour problems and is not adaptable.

In future research, it is necessary to combine the scenarios of mega-constellations to design low-cost and intelligent routing algorithms that can effectively adapt to the load conditions of different areas of the network. Therefore, the present disclosure provides a LEO satellite congestion control routing method based on dynamic division, comprehensively considers the computing and storage resources of the satellite and factors affecting the reliability of data transmission, and provides an intelligent congestion control method in a mega-constellation. Processing method, but while consuming too much resources, the routing effect is close to the global optimal.

SUMMARY

Embodiments of the present application provide a Low Earth orbit (LEO) satellite congestion control routing method, comprising:

Step 1: A LEO satellite periodically detecting queue lengths of a plurality of ports and informing a Geostationary Earth Orbit (GEO) satellite of queue lengths of congested ports in the plurality of ports;

Step 2: The GEO satellite sending the queue lengths of congested ports to a ground station, and a computing center of the ground station calculating link status weights according to the queue lengths of congested ports;

Step 3: According to the link status weights, the computing center of the ground station determining a congestion area;

Step 4: The computing center of the ground station calculating a routing table of satellites in the congestion area, and the ground station sending the routing table to a LEO satellite inside the congestion area;

Step 5: The LEO satellite in the congestion area receiving the routing table, and performing end-to-end transmission of data packets to a destination LEO satellite according to the routing table.

In an embodiment of the present application, in step 2, the link status weights are expressed by the following formula (1):

$$
w_{n,m,t} = \begin{cases} -\left(\dfrac{L_{n,m,t}}{v} + \dfrac{D_{n,m,t}}{c}\right), & \text{if } m \text{ denoting congested ports} \\[2ex] -\dfrac{D_{n,m,t}}{c}, & \text{if } m \text{ denoting non-congested ports} \end{cases} \tag{1}
$$

wherein $w_{n,m,t}$ is a link status weight of the $m^{th}$ port of the $n^{th}$ LEO satellite $s_n$ at time t, $L_{n,m,t}$ is amount of data occupied by a queue of the $m^{th}$ port of the $n^{th}$ LEO satellite $s_n$ at time t, $v$ is a packet processing rate, $D_{n,m,t}$ is a queue length of the $m^{th}$ port of the $n^{th}$ LEO satellite $s_n$ at time t, c is the speed of light, m and n are positive integers.

In an embodiment of the present application, the number of LEO satellites is N, n=1, . . . , N, and the number of the plurality of ports is 4, m=1, . . . , 4, the method further comprises:

the computing center of the ground station performing normalization processing on $w_{n,m,t}$ to obtain a normalized link status weight $w'_{n,m,t}$, using the following formula (2):

$$
w'_{n,m,t} = \frac{w_{n,m,t} - \min(w_{1,1,t}, w_{1,2,t}, \dots, w_{N,4,t})}{\max(w_{1,1,t}, w^1_{1,2,t}, \dots, w_{N,4,t}) - \min(w_{1,1,t}, w_{1,2,t}, \dots, w_{N,4,t})} \tag{2}
$$

wherein max( ) denotes a function to find a maximum, and min( ) denotes a function to find a minimum;

and the computing center of the ground station determining a satellite network status $s_t$ at time t, using the following formula (3):

$$
s_t = \{w'_{1,1,t}, w'_{1,2,t}, \dots, w'_{N,4,t}\}. \tag{3}
$$

In an embodiment of the present application, a range of the congestion area is determined by a flooding hop $a_t$ at time t, $a_t$ is a positive integer, a maximum value of $a_t$ is A, and $a_t$ is calculated by using a ε-greedy strategy, given by the following formula (4):

$$
a_t = \begin{cases} \arg_{a \in \{1,2,\dots,A\}} \max Q(s_t, a) & \text{if } p = \varepsilon \\ \text{random}\{1, 2, \dots, A\} & \text{if } p = 1 - \varepsilon \end{cases} \tag{4}
$$

wherein ε is an exploration rate, and $0 <= \varepsilon <= 1$, p is a probability, $Q(s_t, a)$ denotes an output of a full-connection neutral network when inputting $s_t$ and a.

In an embodiment of the present application, in step 5, the performing comprising:

based on a destination address of a data packet and the routing table, selecting a set of candidate destination satellites from LEO satellites inside the congestion area using a distributed routing method, wherein next hop of each candidate destination satellite is out of the congestion area;

reading link status weights of the candidate destination satellites for the routing table, and selecting a satellite with a smallest weight as the destination LEO satellite.

In an embodiment of the present application, the distributed routing method comprising:

according to a set of candidate satellites determined based on a destination address of a data packet, performing one of the following:

if there is only one candidate satellite in the set, selecting the only one candidate satellite as the destination LEO satellite of next hop;

if there are a plurality of candidate satellites in the set, and only one candidate satellite is out of the congestion area, selecting the only one candidate satellite as the destination LEO satellite of next hop;

if there are a plurality of candidate satellites in the set, and more than one candidate satellite is out of the congestion area, selecting a candidate satellite with the smallest weight from the more than one candidate satellite as the destination LEO satellite of next hop;

if there are a plurality of candidate satellites in the set, and the plurality of candidate satellites are out of the congestion area, selecting a candidate satellite with the smallest weight from the plurality of candidate satellites as the destination LEO satellite of next hop.

DESCRIPTION OF EMBODIMENTS

In order to make the above objects, features and advantages of the present disclosure clearer, specific embodiments of the present disclosure may be further described in detail below with reference to FIGS. 1 to 5 of the accompanying drawings.

Figure 1:
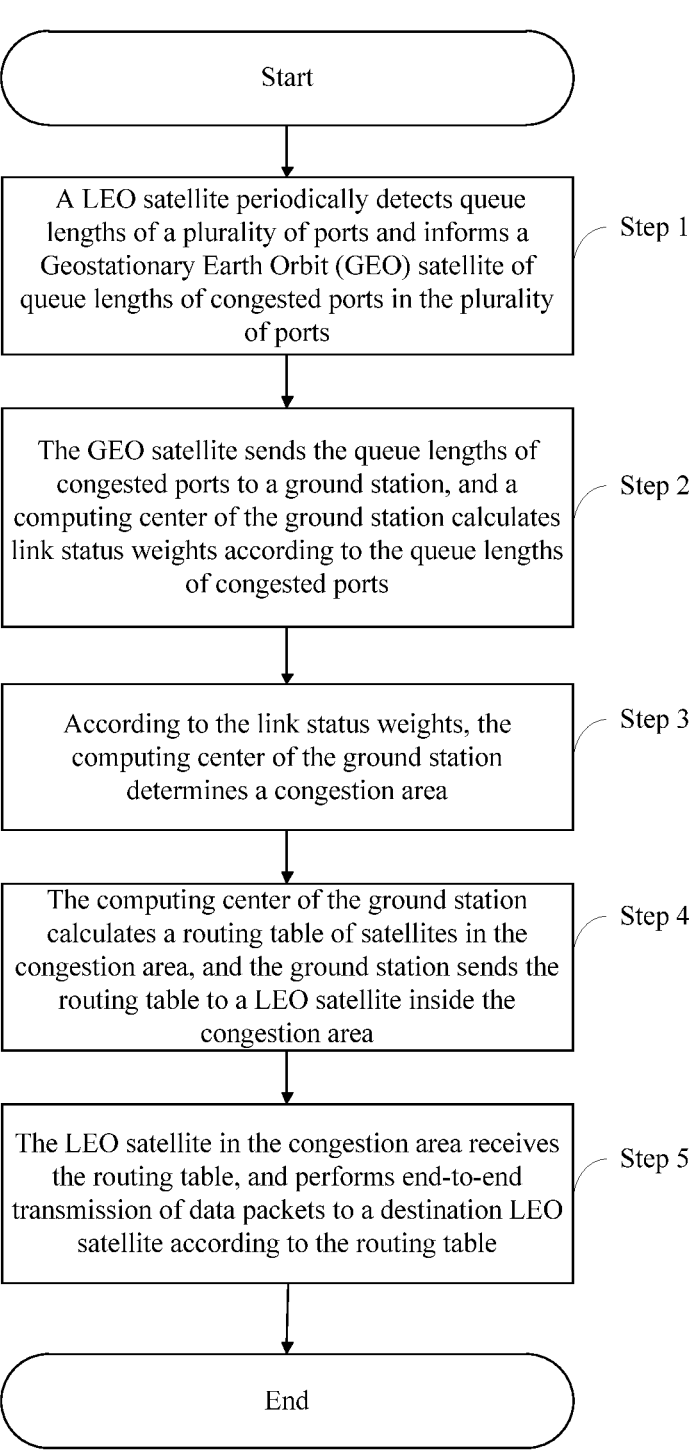
FIG. 1 is a schematic flow chart of the LEO satellite congestion control routing method according to an embodiment of the present disclosure.

As shown in FIG. 1, a Low Earth orbit (LEO) satellite congestion control routing method according to embodiments of the present disclosure includes the following steps:

Step 1: A LEO satellite periodically detects queue lengths of a plurality of ports and informs a Geostationary Earth Orbit (GEO) satellite of queue lengths of congested ports in the plurality of ports.

In an embodiment of the present disclosure, a LEO satellite is configured with 4 ports. Those 4 ports are arranged according to a topology structure, for example, under a grid topology, those 4 ports are arranged each in top, down, left, and right of the LEO satellite.

Each port has a queue to store data packets that the LEO satellite received via such port. Once a data packet is received, it is placed in the queue, and then may be forwarded according to a predefined forwarding rate. The queue length of a port denotes number of packets stored in the queue of the port.

In an embodiment of the present disclosure, the LEO may inform the GEO in a point-to-point communication. Instead of transferring by the ground station, a direct connection between the LEO and the GEO is established. As a result, signaling overhead may be reduced.

In an embodiment of the present disclosure, the periodically detecting may be performed in a predefined interval, e.g., 1 second.

Step 2: The GEO satellite sends the queue lengths of congested ports to a ground station, and a computing center of the ground station calculates link status weights according to the queue lengths of congested ports.

In an embodiment of the present disclosure, a congested port denotes the queue length of the port is beyond a predefined threshold, e.g., 60%.

In an embodiment of the present disclosure, when calculating link status weights of all ports of all satellites, not only the queue lengths of congested ports are used, but the queue lengths of non-congested ports are also used.

Step 3: According to the link status weights, the computing center of the ground station determines a congestion area.

In an embodiment of the present disclosure, the congestion area may also be called as an overload region. The congestion area refers to an area enclosed by at least one satellite which has at least one congested port.

Step 4: The computing center of the ground station calculates a routing table of satellites in the congestion area, and the ground station sends the routing table to a LEO satellite inside the congestion area.

In an embodiment of the present disclosure, the routing table includes entries, representing identifiers (IDs) of other satellites, and an ID of next stop for each of the other satellites.

Step 5: The LEO satellite in the congestion area receives the routing table, and performs end-to-end transmission of data packets to a destination LEO satellite according to the routing table.

In an embodiment of the present disclosure, the end-to-end transmission may refer to the communication between a source LEO satellite and a destination LEO satellite.

In an embodiment of the present disclosure, besides step 1 to step 5, the method further includes:

Step 6: Repeat the above step 1 to step 5 for each packet, until end-to-end transmission of all data packets in a scheduling cycle is completed.

In an embodiment of the present disclosure, a scheduling cycle is configured in advance. Within the scheduling cycle, data packets need to be transmitted one by one. When transmitting each data packet, step 1 to step 5 are repeated.

In an embodiment of the present disclosure, in view of the fact that the routing performance of a satellite network may be affected by queuing delay of the satellite port and spacing between links, in order to save signaling overhead, the queue information of congested ports is collected.

In an embodiment of the present disclosure, in step 2, the link status weights are expressed by the following formula (1):

$$w_{n,m,t} = \begin{cases} -\left(\dfrac{L_{n,m,t}}{v} + \dfrac{D_{n,m,t}}{c}\right), & \text{if } m \text{ denoting congested ports} \\ -\dfrac{D_{n,m,t}}{c}, & \text{if } m \text{ denoting non-congested ports} \end{cases} \quad (1)$$

wherein $w_{n,m,t}$ is a link status weight of the $m^{th}$ port of the $n^{th}$ LEO satellite $s_n$ at time t, $L_{n,m,t}$ is amount of data occupied by a queue of the $m^{th}$ port of the $n^{th}$ LEO satellite $s_n$ at time t, $v$ is a packet processing rate, $D_{n,m,t}$ is a queue length of the $m^{th}$ port of the $n^{th}$ LEO satellite $s_n$ at time t, c is the speed of light, m and n are positive integers.

In an embodiment of the present disclosure, amount of data occupied by a queue may refer to the multiplication of data packets stored in the queue and a size of a data packet.

In an embodiment of the present disclosure, congestion processing is performed by determining the congestion area using intelligent methods.

In an embodiment of the present disclosure, the number of LEO satellites is N, n=1, . . . , N, and the number of the plurality of ports is 4, m=1, . . . , 4, the computing center of the ground station performs normalization processing on $w_{n,m,t}$ to obtain a normalized link status weight $$w'_{n,m,t},$$

using the following formula (2):

$$w'_{n,m,t} = \frac{w_{n,m,t} - \min(w_{1,1,t}, w_{1,2,t}, \dots, w_{N,4,t})}{\max\left(w_{1,1,t}, w^1_{1,2,t}, \dots, w_{N,4,t}\right) - \min(w_{1,1,t}, w_{1,2,t}, \dots, w_{N,4,t})} \quad (2)$$

wherein max( ) denotes a function to find a maximum, and min( ) denotes a function to find a minimum.

The computing center of the ground station determining a satellite network status $s_t$ at time t, using the following formula (3):

$$s_t = \{w'_{1,1,t}, w'_{1,2,t}, \dots, w'_{N,4,t}\}. \tag{3}$$

In order to avoid only focusing on a current strategy during the training process and avoiding the best strategy, a local convergence condition is formed to choose an action that maximizes a function value with probability a. This approach is called ε-greedy strategy.

In an embodiment of the present disclosure, a flooding hop number for the congested link is used as the action set. And a range of the congestion area is determined by a flooding hop.

Define a flooding hop $a_t$ at time t, $a_t$ is a positive integer, a maximum value of $a_t$ is A, and $a_t$ is calculated by using a ε-greedy strategy, given by the following formula (4):

$$a_t = \begin{cases} \arg_{a \in \{1,2,\dots,A\}} \max Q(s_t, a) & \text{if } p = \varepsilon \\ \text{random}\{1, 2, \dots, A\} & \text{if } p = 1 - \varepsilon \end{cases} \tag{4}$$

wherein ε is an exploration rate, and $0 \le \varepsilon \le 1$, p is a probability, $Q(s_t, a)$ denotes an output of a full-connection neutral network when inputting $s_t$ and a. For example, the full-connection neutral network is a Deep Q-Network (DQN).

The action set including all possible $a_t$ may be expressed by:

$$a_t \in \{1, 2, \dots, A\} \tag{5}$$

According to the above method, the congestion area is scalable and can better adapt to the changing status of the network.

In an embodiment of the present disclosure, $$r_{n_i,m}^k$$

is a single-hop reward value of the k th data packet, calculated by the following formula (6), where the time t is omitted:

$$r_{n_i,m}^k = \begin{cases} -\dfrac{L_{n_i,m}}{v} - \dfrac{D_{n_i,m}}{c} - \dfrac{S_k}{v}, & (s_{n_{i+1}} \neq d^k, L_{n_i,m} \neq B) \\ -\dfrac{L_{n_i,m}}{v} - \dfrac{D_{n_i,m}}{c} - \dfrac{S_k}{v} - \beta, & (s_{n_{i+1}} \neq d^k, L_{n_i,m} = B) \\ -\dfrac{L_{n_i,m}}{v} - \dfrac{D_{n_i,m}}{c} - \dfrac{S_k}{v} + \beta, & (s_{n_{i+1}} = d^k) \end{cases} \tag{6}$$

wherein $n_i$ is an index of the satellite that the data packet reaches in the i th hop, $s_{n_i}$ is the satellite numbered $n_i$, and m is an index of data packet transmitted from the current satellite to the next hop satellite, $S_k$ is the data size of the k th data packet, $d^k$ is the destination satellite of the k th data packet, and B is the maximum cache capacity of the queue.

If the next hop of the data packet does not reach the destination satellite and the current cache capacity does not reach the maximum value, the reward value $$-\dfrac{L_{n_i,m}}{v} - \dfrac{D_{n_i,m}}{c} - \dfrac{S_k}{v}$$

may be obtained.

If the next hop of the data packet does not reach the destination satellite but the current cache capacity reaches the maximum value, the penalty value $-\beta$ may be obtained.

If the next hop of the data packet reaches the destination satellite, an additional reward value $\beta$ may be obtained.

In an embodiment of the present disclosure, the total reward value function $r_t$ is shown by:

$$r_t = \sum_{k=1}^{k=M} \sum_{i=1}^{i=N_k} r_{n_i,m}^{k'} \tag{7}$$

wherein M is the total number of data packets generated by the source satellite, $N_k$ is the total number of hops that the k th data packet passes through during transmission, $$r_{n_i,m}^{k'}$$

is the reward value after normalizing $$r_{n_i,m}^k$$

among all $n_i$ and m.

In the present disclosure, DQN relates to the neural network, delayed target network and experience replay strategy in deep learning. Two neural networks are constructed in DQN, namely the evaluation network (eval_net) and the target network (target_net). The neural network uses a fully connected neural network, including input layer, hidden layer and output layer.

Figure 2:
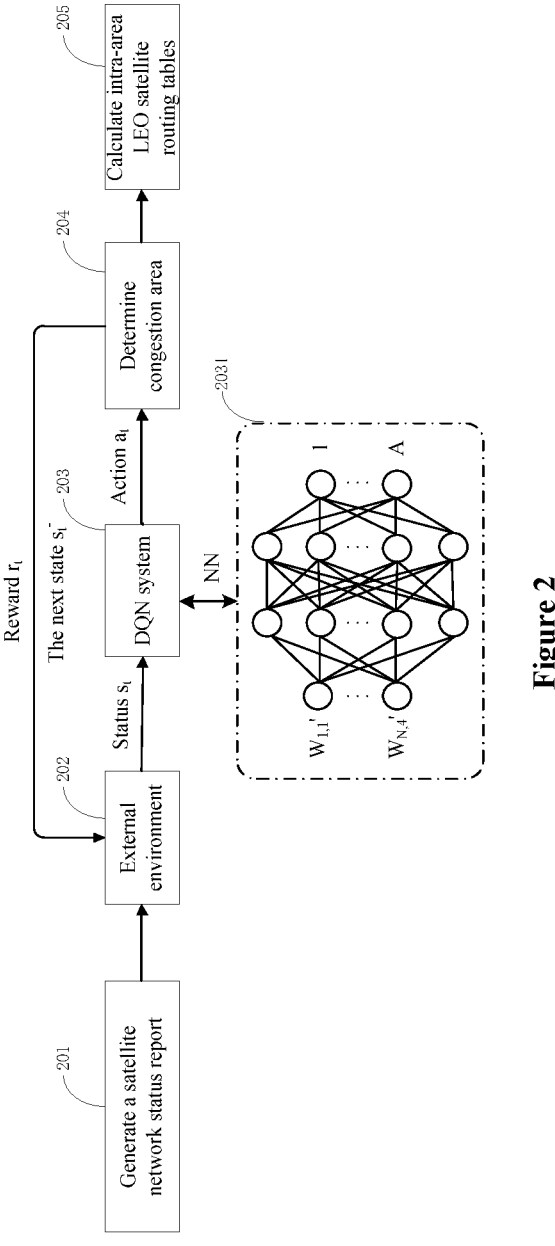
FIG. 2 is a schematic flow chart of the LEO satellite congestion control routing method based on DQN according to an embodiment of the present disclosure.

The flow chart of the DQN-based congestion control method is shown in FIG. 2. GEO satellites may periodically obtain congestion link status information and send the congestion information to the ground station.

In 201, the computing center of the ground station may generate a satellite network status report, including link status weights, as expressed by formula (2).

In 202, the satellite network status report is input into an external environment of an agent which performs a DQN system 203.

In the DQN system 203, the satellite network status, expressed by $s_t$ in the above formula (3), is input into the input layer of the neural network (NN), and through several hidden layers, the output layer outputs actions $a_t$. The layers of a NN are shown in 2031, and the NN forms the DQN system 203.

In 204, the congestion area is determined according to the actions $a_t$.

In 205, the computing center of the ground station calculates the routing tables of LEO satellites in the congestion area and delivers them to the satellites in the congestion area. In this case, those routing tables are also called as intra-area LEO satellite routing tables.

In an embodiment of the present disclosure, the obtained data $$(s_t, a_t, r_t, s_t^-)$$

is put into an experience pool, repeat steps 1 to 5 until the experience pool is full. Then, a sample is randomly extracted from it to calculate the target value y, as shown in the following formula (8):

$$y = r + \gamma \max_a \overline{Q}(s\_, a\_; \theta\_) \qquad (8)$$

wherein $\gamma$ is the attenuation value of future rewards. The closer $\gamma$ is to 1, the more sensitive the machine is to future rewards.

In an embodiment of the present disclosure, the mean square error (MSE) loss function L($\theta$), is calculated as shown in formula (9):

$$L(\theta) = E[(y - Q(s, a; \theta))^2] \qquad (9)$$

The MSE loss function represents the deviation between the estimated value and the actual value. Use stochastic gradient descent to update eval_net weights, and assign eval_net parameters to target_net at fixed update frequencies. Repeat over and over again, minimizing the loss function until target_net completes convergence.

Further, in step 5, the routing decision includes determining whether the current satellite node is in the congestion area:

If the satellite is not in the congestion area: select the next hop satellite according to a distributed routing method. The specific distributed routing method is:

according to a set of candidate satellites determined based on a destination address of a data packet, performing one of the following:

if there is only one candidate satellite in the set, selecting the only one candidate satellite as the destination LEO satellite of next hop;

if there are a plurality of candidate satellites in the set, and only one candidate satellite is out of the congestion area, selecting the only one candidate satellite as the destination LEO satellite of next hop;

if there are a plurality of candidate satellites in the set, and more than one candidate satellite is out of the congestion area, selecting a candidate satellite with the smallest weight from the more than one candidate satellite as the destination LEO satellite of next hop;

if there are a plurality of candidate satellites in the set, and the plurality of candidate satellites are out of the congestion area, selecting a candidate satellite with the smallest weight from the plurality of candidate satellites as the destination LEO satellite of next hop.

The smallest weight may refer to the smallest link status weight or the smallest sum of link status weights for one satellite.

If the satellite is currently located is in the congestion area in step 5, the performing includes:

based on a destination address of a data packet and the routing table, selecting a set of candidate destination satellites from LEO satellites inside the congestion area using a distributed routing method, wherein next hop of each candidate destination satellite is out of the congestion area;

reading link status weights of the candidate destination satellites for the routing table, and selecting a satellite with a smallest weight as the destination LEO satellite.

Figure 3:
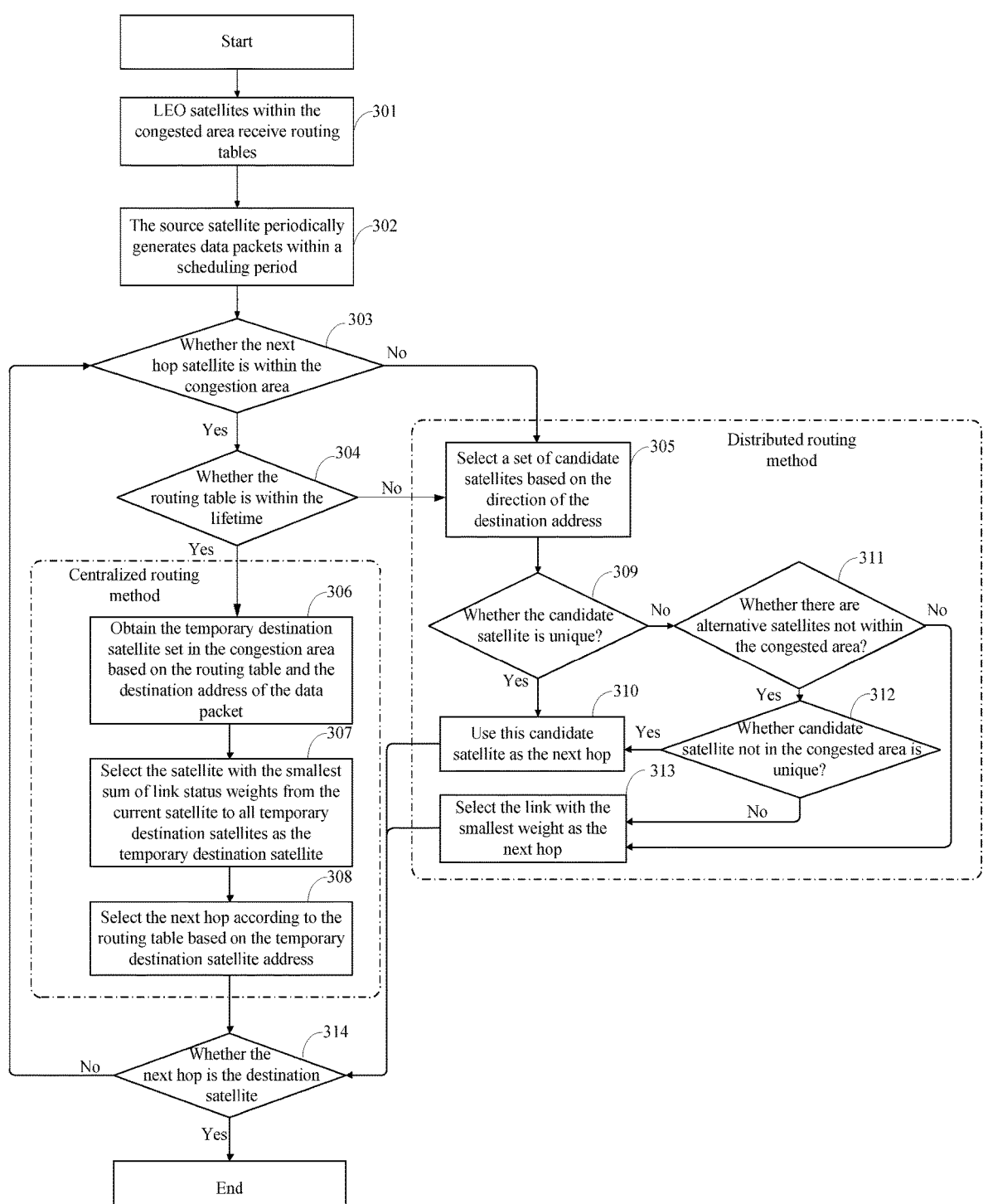
FIG. 3 is a schematic diagram of the routing decision of the LEO satellite congestion control routing method according to an embodiment of the present disclosure.

As shown in FIG. 3, the LEO satellite congestion control routing method includes:

301, LEO satellites within the congested area receive routing tables.

302, The source satellite periodically generates data packets within a scheduling period.

303, A LEO satellite determines whether the next hop satellite is within the congestion area. If yes, perform 304, otherwise perform 305.

304, The LEO satellite determines whether the routing table is within the lifetime, in other words, whether the routing table is valid. If yes, perform the centralized routing method, i.e., 306-308, otherwise perform the distributed routing method, i.e., 305, 309-313.

305, The LEO satellite selects a set of candidate satellites based on the direction of the destination address.

306, The LEO satellite obtains the temporary destination satellite set in the congestion area based on the routing table and the destination address of the data packet.

307, The LEO satellite selects a satellite with the smallest sum of link status weights from all temporary destination satellites as the temporary destination satellite.

As shown in the above formula (1), the smallest sum of link status weights means for each temporary destination satellite, summing up $w_{n,m,t}$ over all values of m, i.e., m=1, 2, 3, 4.

308, The LEO satellite selects the next hop according to the routing table based on the address of the temporary destination satellite.

309, The LEO satellite determines whether the candidate satellite is unique. If yes, perform 310, otherwise perform 311.

310, The LEO satellite uses this candidate satellite as the next hop.

311, The LEO satellite determines whether there are alternative satellites that are not within the congested area. If yes, perform 312, otherwise perform 313.

312, The LEO satellite determines whether the candidate satellite not in the congested area is unique. If yes, perform 310, otherwise perform 313.

313, The LEO satellite selects the link with the smallest weight as the next hop.

314, The LEO satellite determines whether the next hop is the destination satellite. If yes, the process ends, otherwise perform 303.

In an example of the present disclosure, a three-layer communication network is deployed, which includes a ground communication network, a LEO satellite communication network, and a GEO satellite communication network. The LEO satellite network contains a total of 1,800 satellites. These satellites are evenly arranged on 60 orbital planes, and the phase factor is 3. The orbital inclination is 55 degrees and the altitude is 508 kilometers; the GEO satellite network is responsible for collecting LEO satellite network status information (including the above-described link status weights) and selecting LEO satellites to regularly send routing tables; the computing center of the ground station is responsible for training models, dividing congestion areas and calculating routing tables.

Figure 4:
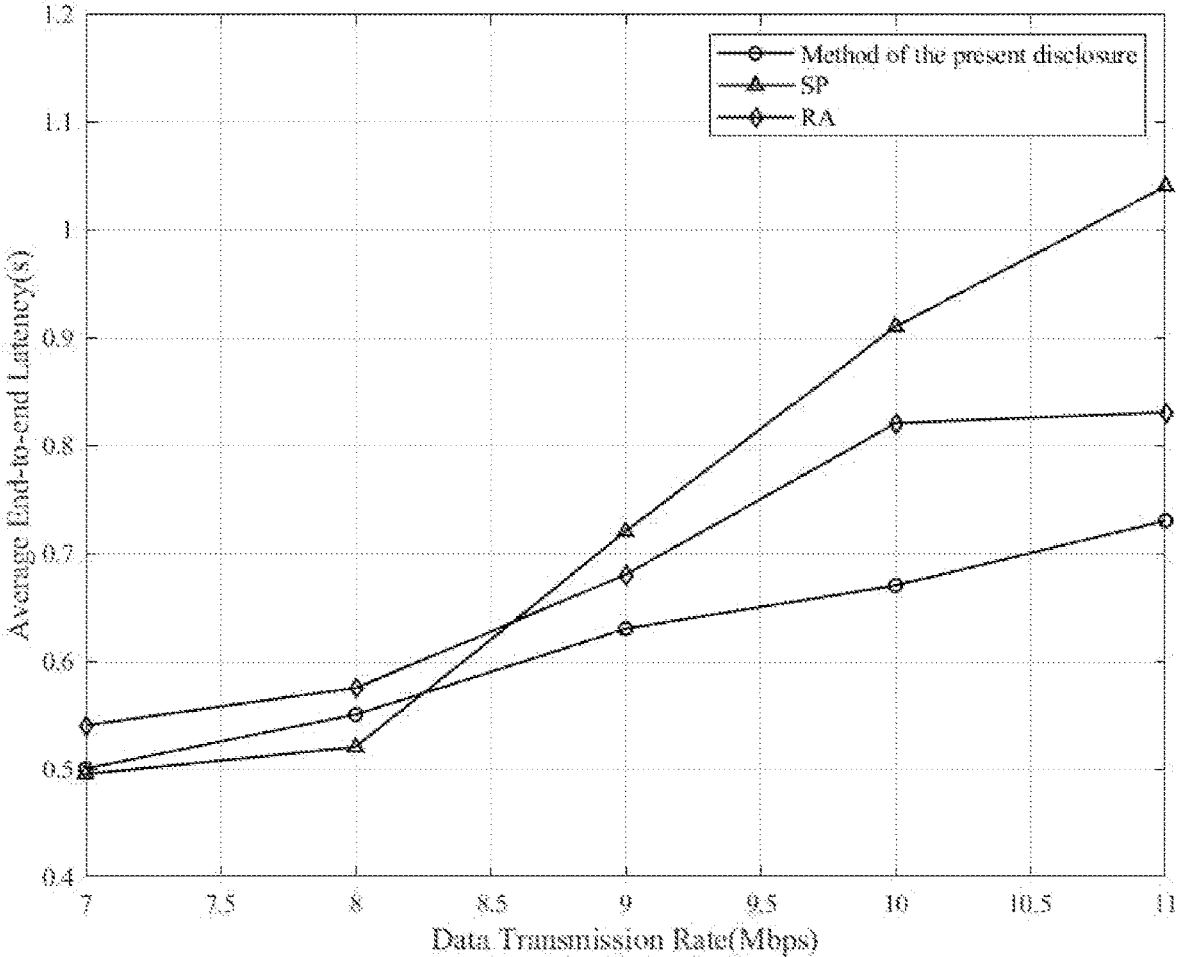
FIG. 4 shows the average end-to-end latency under different data transmission rates according to an embodiment of the present disclosure.
Figure 5:
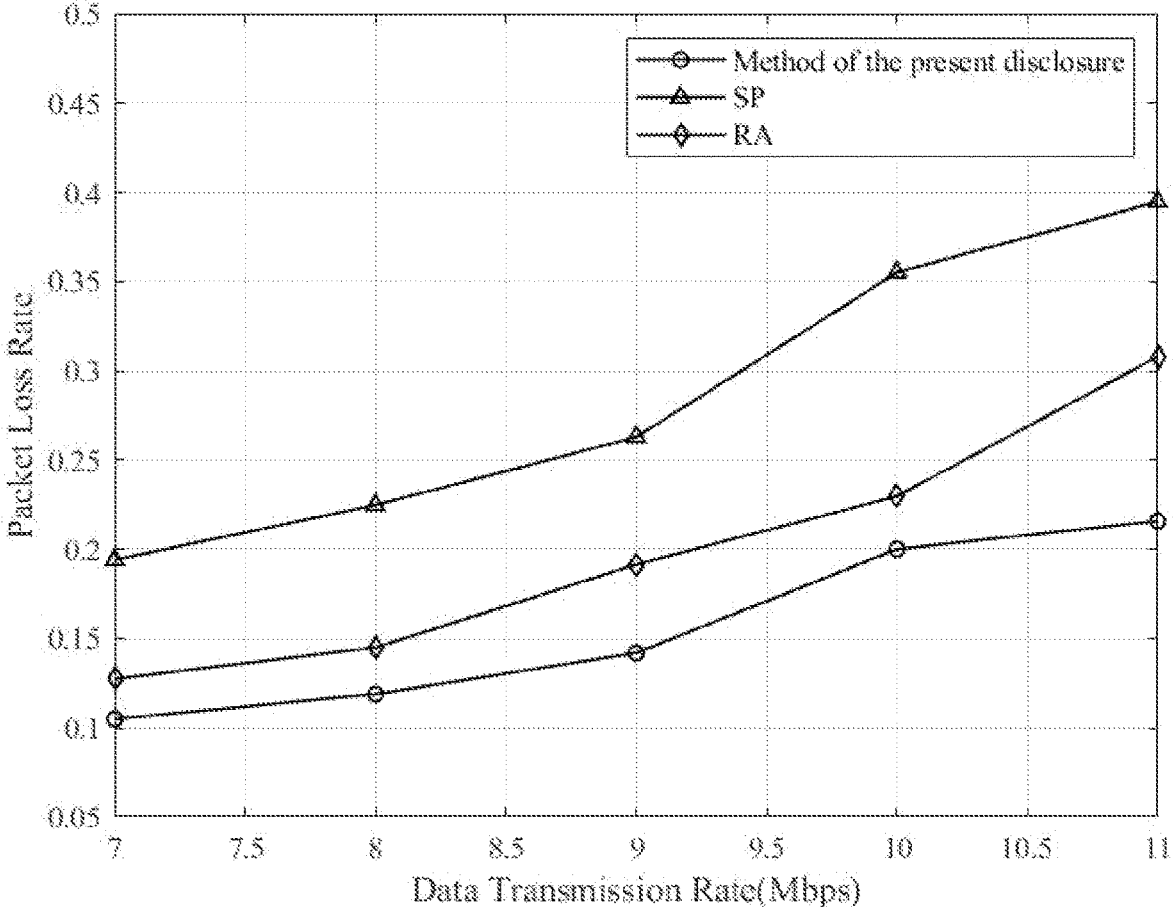
FIG. 5 shows the packet loss rate under different data transmission rates according to an embodiment of the present disclosure.

As shown in FIGS. 4 and 5, in the experimental examples, different levels of congestion in the LEO satellite network is simulated by changing the data packet generation rate, and the reliability of the above-described method according to embodiments of the present disclosure is evaluated through the average end-to-end latency and packet loss rate. In specific, the satellite link bandwidth capacity is set to 8 Mbps, the buffer size of each link is set to 100 packets, the size of each packet is set to 4 KB, and the congestion threshold is set to 60%.

Compared with the traditional methods, i.e., "SP" denoting a shortest path method, "RA" denoting a random action method, when the data transmission rate is 11 Mbps, the LEO satellite congestion control routing method according to embodiments of the present disclosure can reduce the average end-to-end latency by a maximum of 30%, and at the same time reduce the average end-to-end latency by approximately 45% in terms of a packet loss rate.

According to embodiments of the present disclosure, the following technical effects can be achieved:

1. The method relies on the location and status information of congested links and only performs rerouting calculations for satellites in the congestion area: LEO satellites only periodically collect congested link status information, and the centralized controller only needs to calculate and transmitting the routing table for LEO satellites in the congestion area.

Thus, it can reduce a large amount of signaling overhead caused by flooding congested link information and routing tables in the traditional method, reduce communication delay and end-to-end latency, the computing and storage pressure of satellites, making it more applicable in large-scale satellite constellations.

2. The method adopts a hybrid routing mechanism in different areas: a hybrid routing mechanism that combines centralized and distributed routing, and a centralized routing method is used in the congestion area. The centralized controller determines the congestion area according to the distribution of congested links within the network.

Routing on the data packet of satellites in the congestion area enables the data packets to leave the congestion area as soon as possible and reduces the packet loss of the network; the distributed routing method is adopted outside the congestion area, because the congestion degree outside the congestion area is low. In order to reduce the computing pressure of the centralized controller and reduce signaling overhead, using a distributed routing method, allows satellites to complete routing decisions based on their own link information and destination addresses.

3. The method can adaptively adjust the range of the congestion area, i.e., when the congestion area is too small, and the amount of data carried inside the congestion area is large, when the data packet passes through the satellites in the congestion area, it may consume too much delay; when the congestion area is too large, and in order to deliver the data packet across the congestion area as soon as possible, temporary destination satellites whose destination addresses may be far away from the source address may be selected, resulting in more detour problems.

Therefore, the method uses deep reinforcement learning to generate the congestion area to be flexible and scalable, based on the distributed congestion link status of the satellite network. The congestion area allows data packets to pass through the congestion area as quickly as possible, while reducing bypass problems in the routing process, further reducing end-to-end latency and improving packet loss rate, and enhancing the reliability of data transmission.

The present disclosure is not limited by the above-mentioned embodiments. What is described in the above-mentioned embodiments and description is only to illustrate the principle of the present disclosure. Without departing from the concept and scope of the present disclosure, there may be various changes and improvements in the present disclosure. These changes and improvements all fall within the protection scope of the claims.

What is claimed is:

1. A Low Earth orbit (LEO) satellite congestion control routing method, comprising:
   Step 1: A LEO satellite periodically detecting queue lengths of a plurality of ports and informing a Geostationary Earth Orbit (GEO) satellite of queue lengths of congested ports in the plurality of ports;
   Step 2: The GEO satellite sending the queue lengths of congested ports to a ground station, and a computing center of the ground station calculating link status weights according to the queue lengths of congested ports;
   Step 3: According to the link status weights, the computing center of the ground station determining a congestion area;
   Step 4: The computing center of the ground station calculating a routing table of satellites in the congestion area, and the ground station sending the routing table to a LEO satellite inside the congestion area;
   Step 5: The LEO satellite in the congestion area receiving the routing table, and performing end-to-end transmission of data packets to a destination LEO satellite according to the routing table.

2. The method according to claim 1, wherein in step 2, the link status weights are expressed by the following formula (1):

$$w_{n,m,t} = \begin{cases} -\left(\frac{L_{n,m,t}}{v} + \frac{D_{n,m,t}}{c}\right), & \text{if } m \text{ denoting congested ports} \\ -\frac{D_{n,m,t}}{c}, & \text{if } m \text{ denoting non-congested ports} \end{cases} \quad (1)$$

wherein $w_{n,m,t}$ is a link status weight of the $m^{th}$ port of the $n^{th}$ LEO satellite $s_n$ at time t, $L_{n,m,t}$ is amount of data occupied by a queue of the $m^{th}$ port of the $n^{th}$ LEO satellite $s_n$ at time t, v is a packet processing rate, $D_{n,m,t}$ is a queue length of the $m^{th}$ port of the $n^{th}$ LEO satellite $s_n$ at time t, c is the speed of light, m and n are positive integers.

3. The method according to claim 2, wherein the number of LEO satellites is N, n=1, . . . , N, and the number of the plurality of ports is 4, m=1, . . . , 4, the method further comprises:
   the computing center of the ground station performing normalization processing on $w_{n,m,t}$ to obtain a normalized link status weight $$w'_{n,m,t},$$

using the following formula (2):

$$w'_{n,m,t} = \frac{w_{n,m,t} - \min(w_{1,1,t}, w_{1,2,t}, \ldots, w_{N,4,t})}{\max(w_{1,1,t}, w^1_{1,2,t}, \ldots, w_{N,4,t}) - \min(w_{1,1,t}, w_{1,2,t}, \ldots, w_{N,4,t})} \quad (2)$$

wherein max( ) denotes a function to find a maximum, and min( ) denotes a function to find a minimum;

and the computing center of the ground station determining a satellite network status $s_t$ at time t, using the following formula (3):

$$s_t = \left\{ w'_{1,1,t}, w'_{1,2,t}, \ldots, w'_{N,4,t} \right\}. \qquad (3)$$

4. The method according to claim 3, wherein a range of the congestion area is determined by a flooding hop $a_t$ at time t, $a_t$ is a positive integer, a maximum value of $a_t$ is A, and $a_t$ is calculated by using a ε-greedy strategy, given by the following formula (4):

$$a_t = \begin{cases} \arg_{a \in \{1,2,\ldots,A\}} \max Q(s_t, a) & \text{if } p = \varepsilon \\ \text{random}\{1, 2, \ldots, A\} & \text{if } p = 1 - \varepsilon \end{cases} \qquad (4)$$

wherein ε is an exploration rate, and 0<=ε<=1, p is a probability, $Q(s_t, a)$ denotes an output of a full-connection neutral network when inputting $s_t$ and a.

5. The method according to claim 1, wherein in step 5, the performing comprising:

based on a destination address of a data packet and the routing table, selecting a set of candidate destination satellites from LEO satellites inside the congestion area using a distributed routing method, wherein next hop of each candidate destination satellite is out of the congestion area;

reading link status weights of the candidate destination satellites for the routing table, and selecting a satellite with a smallest weight as the destination LEO satellite.

6. The method according to claim 5, wherein the distributed routing method comprising:

according to a set of candidate satellites determined based on a destination address of a data packet, performing one of the following:

if there is only one candidate satellite in the set, selecting the only one candidate satellite as the destination LEO satellite of next hop;

if there are a plurality of candidate satellites in the set, and only one candidate satellite is out of the congestion area, selecting the only one candidate satellite as the destination LEO satellite of next hop;

if there are a plurality of candidate satellites in the set, and more than one candidate satellite is out of the congestion area, selecting a candidate satellite with the smallest weight from the more than one candidate satellite as the destination LEO satellite of next hop;

if there are a plurality of candidate satellites in the set, and the plurality of candidate satellites are out of the congestion area, selecting a candidate satellite with the smallest weight from the plurality of candidate satellites as the destination LEO satellite of next hop.

* * * * *